US008412225B1

United States Patent
Fong et al.

(10) Patent No.: US 8,412,225 B1
(45) Date of Patent: *Apr. 2, 2013

(54) MULTI-CARRIER LOAD BALANCING SCHEME FOR VOICE AND DATA

(75) Inventors: Mo-Han Fong, L'Orignal (CA); Ali Iraqi, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/459,690

(22) Filed: Apr. 30, 2012

Related U.S. Application Data

(63) Continuation of application No. 12/856,818, filed on Aug. 16, 2010, now Pat. No. 8,180,362, which is a continuation of application No. 10/673,480, filed on Sep. 30, 2003, now Pat. No. 7,860,511.

(60) Provisional application No. 60/415,589, filed on Oct. 2, 2002.

(51) Int. Cl.
*H04W 72/00* (2009.01)
(52) U.S. Cl. ............ 455/453; 455/450; 455/452.1; 455/452.2
(58) Field of Classification Search .......... 455/450, 455/452.1, 452.2, 453
See application file for complete search history.

(56) References Cited

U.S. PATENT DOCUMENTS

| 4,670,899 A | 6/1987 | Brody et al. |
| 4,870,408 A * | 9/1989 | Zdunek et al. ............ 370/341 |
| 5,241,685 A | 8/1993 | Bodin et al. |
| 5,796,722 A | 8/1998 | Kotzin et al. |
| 6,122,292 A * | 9/2000 | Watanabe et al. ......... 370/468 |
| 6,278,701 B1 | 8/2001 | Ayyagari et al. |
| 6,456,850 B1 | 9/2002 | Kim et al. |
| 6,574,474 B1 | 6/2003 | Nielsen |
| 6,594,495 B2 | 7/2003 | Salonaho et al. |
| 6,658,257 B1 * | 12/2003 | Hirayama et al. ......... 455/451 |

OTHER PUBLICATIONS

U.S. Appl. No. 12/856,818, Notice of Allowance dated Jan. 17, 2012.

* cited by examiner

*Primary Examiner* — Charles Appiah
*Assistant Examiner* — Jaime Holliday

(57) ABSTRACT

A method for preventing the occurrence of overload conditions in a multi-carrier communication system such as, but not limited to, enhancements to 1xEV-DV by controlling the amount of voice and data users having access to the communication system in order to provide enhanced QoS and load balancing. The method includes converting one of carriers in the multi-carrier voice/data system to a voice-only carrier when loading exceeds a given threshold related to QoS and outage criteria.

21 Claims, 4 Drawing Sheets

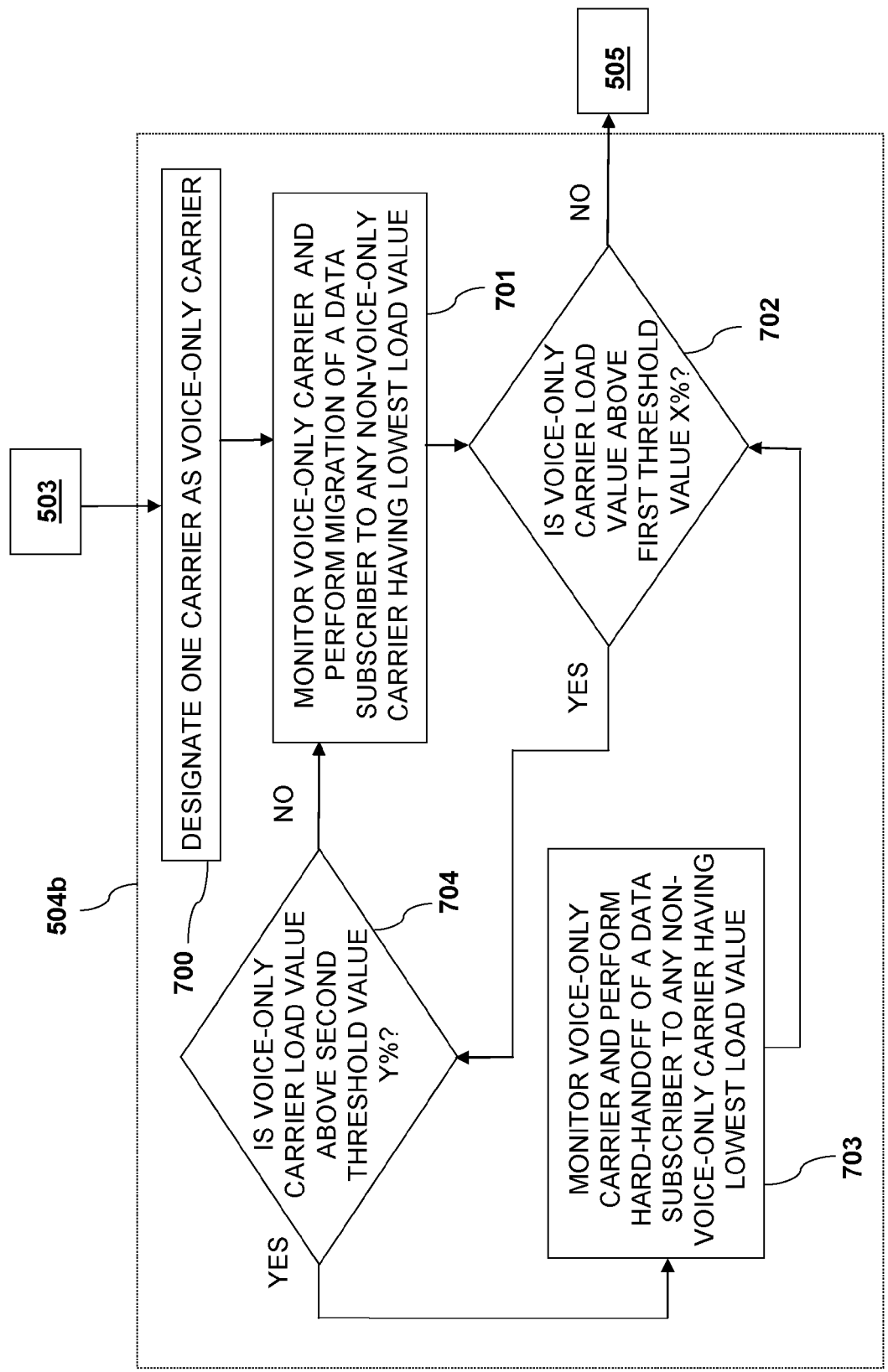

MULTI-CARRIER LOAD BALANCING SCHEME FOR VOICE AND DATA

CROSS-REFERENCE TO RELATED APPLICATIONS

The present application is a continuation of U.S. Ser. No. 12/856,818 filed Aug. 16, 2010, which is a continuation of U.S. Ser. No. 10/673,480 filed Sep. 30, 2003, now issued as U.S. Pat. No. 7,860,511, which claims the benefit of U.S. Ser. No. 60/415,589 filed Oct. 2, 2002, the disclosure of which is expressly incorporated herein by reference in its entirety.

FIELD

The present invention relates to methods for efficiently controlling access to a communication system. More particularly, the present invention relates to a method for preventing the occurrence of overload conditions in a multi-carrier communication system by controlling the amount of voice and data users having access to the communication system.

BACKGROUND

Wireless communication systems, and in particular, multi-carrier systems such as Code Division Multiple Access (CDMA) include many communication channels through which subscribers of such systems communicate with each other and with the system. CDMA systems and other similar communication systems have a certain inherent capacity. That is to say, such systems are limited by the amount of communication channels that can be made available to subscribers of such systems. The capacity of a communication system is the amount of information per unit time (i.e., information rate) that can be transferred within the system while at the same time maintaining an acceptable quality of communications (i.e., quality of service or simply QoS). The operator of the communication system often defines the acceptable QoS. However, recent systems are now heading towards levels of acceptable QoS required, and thereby defined, by the given subscriber. System capacity is typically related directly to the number of subscribers using the given system where the more subscribers there are using the system, the higher the information rate.

Topology of a typical CDMA system involves numerous cells each of which form a sector that is simply a particular geographical area or terrain that is covered by the system. Such cells are usually symbolically represented having borders that form hexagons where the hexagons are areas of coverage within which subscribers located in the same cell communicate with the cell. Each cell has system equipment that is owned and controlled by a system operator. The system equipment is used by the system to admit subscribers to the system subject, of course, to system capacity and QoS requirements. Thus, subscribers of the system gain access to the communication system for communicating with each other and/or with the system. At least part of the system equipment is commonly located at a base station. Some of the system equipment at the base stations is radio frequency (RF) transmitters and receivers for transmitting and receiving communication signals.

Other system equipment that can also be located at a base station provides the operations, administration, and maintenance (OA&M) services typically associated with communications equipment. For example, allocating communication channels for subscribers, and giving subscribers access to the communication system are some of the services provided by the OA&M equipment. A given subscriber provided access to the communication system can communicate with other subscribers via the base station corresponding to the cell in which the given subscriber is located.

For CDMA communication systems, a subscriber gains access by making a request to system equipment usually located at a base station. For example, a given subscriber in the cell will make a request to that cell's base station to have radio access to the communication system. System equipment at that base station will receive the request and decide whether to provide that subscriber with access to the communication system. That subscriber and related base station (as well as other base stations and subscribers) communicate via communication channels called forward links and reverse links. The forward link is a communication channel through which base station transmits communication signals to subscriber. The reverse link is a communication channel through which subscriber transmits communication signals to base station. Thus, each subscriber has a forward link and a reverse link that it uses to communicate with system equipment and/or with other subscribers of the communication system.

Typically, the system decides to provide access to a subscriber by performing a power level analysis that attempts to maintain the QoS among subscribers. The system could continue to admit subscribers and thus keep increasing its information rate. However, at some point an overload condition will occur that causes QoS to be degraded. An overload condition occurs when QoS for existing voice and/or data calls drops below an acceptable level set by the system operator. Often, the acceptable level is set as a threshold below the system's ultimate capacity. One example of an overload condition is when a cell communicates with a relatively large number of subscribers such that the system cannot meet the desired signal to noise ratio requirement. In order to balance the load on the system, several prior art attempts have been made utilizing thresholds as triggering mechanisms.

U.S. Pat. No. 4,670,899 granted to Brody et al. on 2 Jun. 1987 discloses load balancing for cellular radiotelephone systems. In Brody et al., balancing of loading of cells in a cellular mobile radio telephone system is performed by periodically determining the channel utilization of each cell, computing a representative voice channel occupancy level, and attempting to hand-off calls from cells with higher voice channels occupancy levels to adjacent cells with lower voice channel occupancy levels. Voice channel occupancy levels of cells are measured and compared with threshold values, and the results of the comparisons are used to direct cells to enter predetermined states. In one state, directing cells prevent complete cell blockage to hand-off calls to adjacent cells. In another state, voice channels are preserved for incoming hand-offs by directing the cell to deny access to mobile transceivers initiating new calls. Cells may assume a combined stage wherein both of these functions are performed simultaneously. Cells are selected as hand-off candidates for hand-offs initiated to more evenly distribute loading throughout the cellular system in accordance with cell state (i.e., voice channel occupancy level) and measured signal strength at the cells of the calls attempted to be handed off.

U.S. Pat. No. 5,241,685 granted to Bodin et al. on 31 Aug. 1993 discloses a load sharing control for a mobile cellular radio system. In Bodin et al., load balancing in a mobile cellular radio system is achieved by dynamically moving the borders between any two cells such that an overloaded cell becomes smaller and the neighboring cell larger. This is achieved by lowering the entering signal strength threshold for handoff to the neighboring cell and/or increasing the entering signal strength threshold for handoff from the neighboring cell. Thresholds are unique for any two cells.

U.S. Pat. No. 6,456,850 granted to Kim et al. on 24 Sep. 2002 discloses a method for preventing overload conditions in a communication system. The communication system performs a call load analysis and admits a subscriber requesting admission (or responding to a page) to the system based on the result of the call load analysis. The call load analysis is based on the signal to noise power ratios of all subscribers already admitted to the communication system. External jammer signals that interfere with subscriber signals thus reducing the coverage of the communication system do not affect the call load analysis. The jammer signals therefore, do not hinder an efficient use of the capacity of the communication system. A threshold value is established and such threshold value is compared to an average call load value calculated from a plurality of instantaneous call load values. When the calculated average call load value is substantially equal to or above the established threshold, no subscribers are admitted to the communication system; subscribers are admitted when the calculated average call load value is below the established threshold. Individual subscribers whose contributions to the average call load value are deemed significant (tending to cause or actually causing overload conditions) are identified and removed from the system.

U.S. Pat. No. 6,574,474 granted to Nielsen on 3 Jun. 2003 discloses load balancing for cellular and wireless systems. In Nielsen, a system is disclosed for assigning a cellular site to provide wireless telephone service to a mobile telephone set based upon two criteria. This invention assigns a cellular site to provide service based upon a primary criteria, such as signal strength between the cellular site and the mobile telephone set. A secondary criteria, such as load of the cellular site, is then checked to determine whether a threshold has been exceeded by the assignment of the cellular site to provide service. If the threshold for the secondary criteria is exceeded by the assignment, another cellular site is assigned to provide service to the mobile telephone set.

In a wireless system supporting both power-controlled voice service (or generally any other real-time, circuit-switched service) and rate-controlled data service, there is a need to ensure the QoS or outage criteria of both voice and data are met, while maximizing the overall system capacity. Such wireless systems include the evolution of the CDMA2000 1x system that is also known as 1xEV-DV (1x EVolution for Data and Voice). CDMA operators around the world are upgrading their wireless networks from IS-95 to 1xEV-DV in order to cope with the ever-increasing demand of wireless communication needs and to offer new services such as high-speed access to the Internet. However, offering services to voice and high rate data users simultaneously is quite challenging. Enhancements to the 1xEV-DV system are needed to offer packet data services at greater and greater rates (>2 Mbps) while simultaneously supporting voice users. QoS and load balancing are two major related concerns.

Moreover, the above-referenced prior art does not address multi-carrier communication systems. What is needed therefore is method for preventing the occurrence of overload conditions in a multi-carrier communication system by controlling the amount of voice and data users having access to the communication system in order to provide enhanced QoS and load balancing.

SUMMARY

The present invention provides a method for preventing the occurrence of overload conditions in a multi-carrier communication system such as, but not limited to, enhancements to the 1xEV-DV system by controlling the amount of voice and data users having access to the communication system in order to provide enhanced QoS and load balancing.

There is provided a method of balancing real-time service traffic and data traffic in a wireless communications network. The method comprises steps of: establishing a maximum load value for at least one of a real-time service traffic and data traffic on a carrier; and maintaining loading on said carrier at a level no greater than said established maximum load value by converting said carrier from real-time service traffic and data traffic to real-time-service-only traffic upon exceeding said established maximum load value; wherein said established maximum load value is a threshold defined to ensure acceptable quality of communications.

There is additionally provided a method of balancing real-time service traffic and data traffic in a wireless communications network that comprises the steps of: (a) establishing a nominal value for acceptable quality of communications; (b) distributing real-time service subscribers among a plurality of carriers until a load value for each carrier exceeds said nominal value; (c) converting one of said carriers to a real-time-service-only carrier; (d) upon said load value of all carriers other than said real-time-service-only carrier exceeding said nominal value, admitting said new real-time service subscriber to said real-time-service-only carrier; (e) upon said load value of said real-time-service-only carrier falling below said nominal value, converting said real-time-service-only carrier back to a real-time service and data carrier; and (f) repeating steps b though e.

BRIEF DESCRIPTION OF THE DRAWINGS

FIG. 5 is a flowchart corresponding to FIG. 2 that shows conversion of a carrier with hard handoff and migration during voice loading in accordance with the present invention.

DETAILED DESCRIPTION

Figures 1, 2:
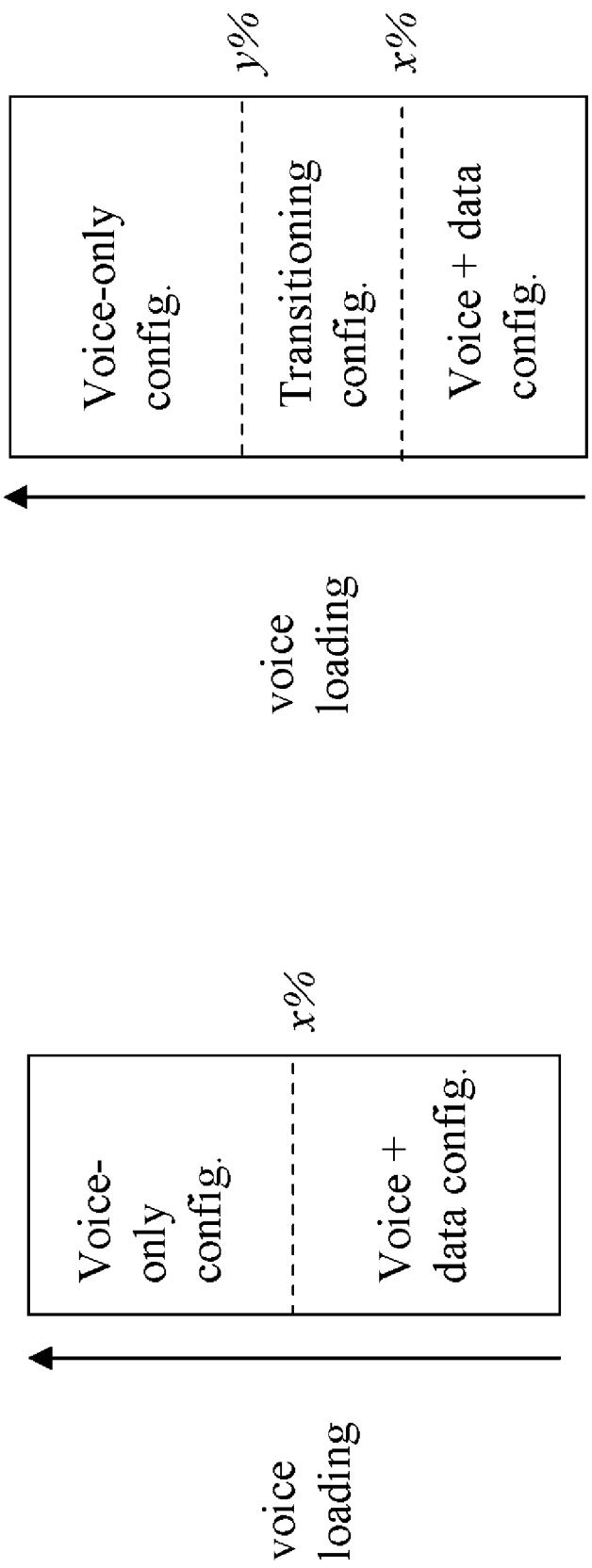
FIG. 1 is a diagram that shows conversion of a carrier with hard handoff during voice loading in accordance with the present invention.
FIG. 2 is a diagram that shows conversion of a carrier with hard handoff and migration during voice loading in accordance with the present invention.

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention is a method within a wireless system supporting both power-controlled voice service and rate-controlled data service. It should be readily understood that the voice service may be generalized to any other real-time circuit-switched service. The present invention ensures that the QoS or outage criteria of both voice and data are met while maximizing the overall system capacity. The method according to the present invention accomplishes this by balancing the voice and data loading in each carrier. This is especially applicable to enhancements of 1xEV-DV in terms of a multi-carrier deployment.

In a single carrier deployment, voice and data are supported on the same carrier. In a multi-carrier deployment such as 1xEV-DV systems, there are different ways of allocating voice and data services into the available carriers. One possible scheme is to segregate voice and data into separate carriers. However, it has been found that such a scheme is inferior to the case of mixed voice and data per carrier. This is because there is a high variance in the base station power consumed by the power-controlled voice service. In order to ensure an acceptable base station power-blocking rate or frame error rate (FER) outage rate, the mean operating base station power is about 50% or any suitable ratio. Ideally, the instantaneous remaining base station power should be leveraged to support the less delay-sensitive, rate-controlled data service. Therefore, mixed voice and data per-carrier outperforms segregating voice and data into separate carriers. Simulation results show that the capacity gain is about 12-24% in this regard.

However, the presence of data users increases the intra and inter-cell interference experienced by voice users, thus increases the overall desired traffic channel power to total sector power required. This leads to higher base station power outage and voice FER outage compared to the case of a voice-only carrier. Based upon previous observations, for up to a specified threshold (e.g., 50%) of nominal voice loading, the base station power outage and voice FER outage can be maintained such that voice system outage is less than a specific outage criteria. For example, voice system outage pertains to the percentage of voice users (e.g., 3%) that have short term FER greater than 15% for more than 1% of the time.

On the other hand, the presence of voice users reduce the available base station power for data. Based on previous observations, the data sector throughput decreases linearly with the increase of nominal voice loading. The data service outage can be maintained at an acceptable level with up to a specified threshold (e.g. 50%) of nominal voice loading. In light of the aforementioned, it is readily apparent that the challenge of supporting mixed voice and data per-carrier is to ensure the QoS or outage criteria of both voice and data are met. The present invention satisfies this challenge by a load-balancing scheme of voice and data across multiple carriers.

The present invention involves first evenly loading each carrier with voice service until the nominal voice loading on each carrier has reached a predefined threshold, x %, where x is defined to ensure acceptable QoS and outage probability of both voice and data service. In other words, x is a nominal value that represents the acceptable quality of communications. As described earlier, x can be set at 50%. This can be achieved by admitting a new voice call into the most lightly loaded carrier. Voice loading is shown in FIG. 1 and FIG. 2 and represented by steps 501, 502, and 503 in FIG. 3. The loading method involves establishing a nominal value for acceptable quality of communications, monitoring each carrier for a new voice subscriber, determining the load value for each carrier, and admitting the voice subscriber to any carrier having the lowest load value. This loads all carriers evenly until all carrier loads are above the nominal value.

Figure 3:
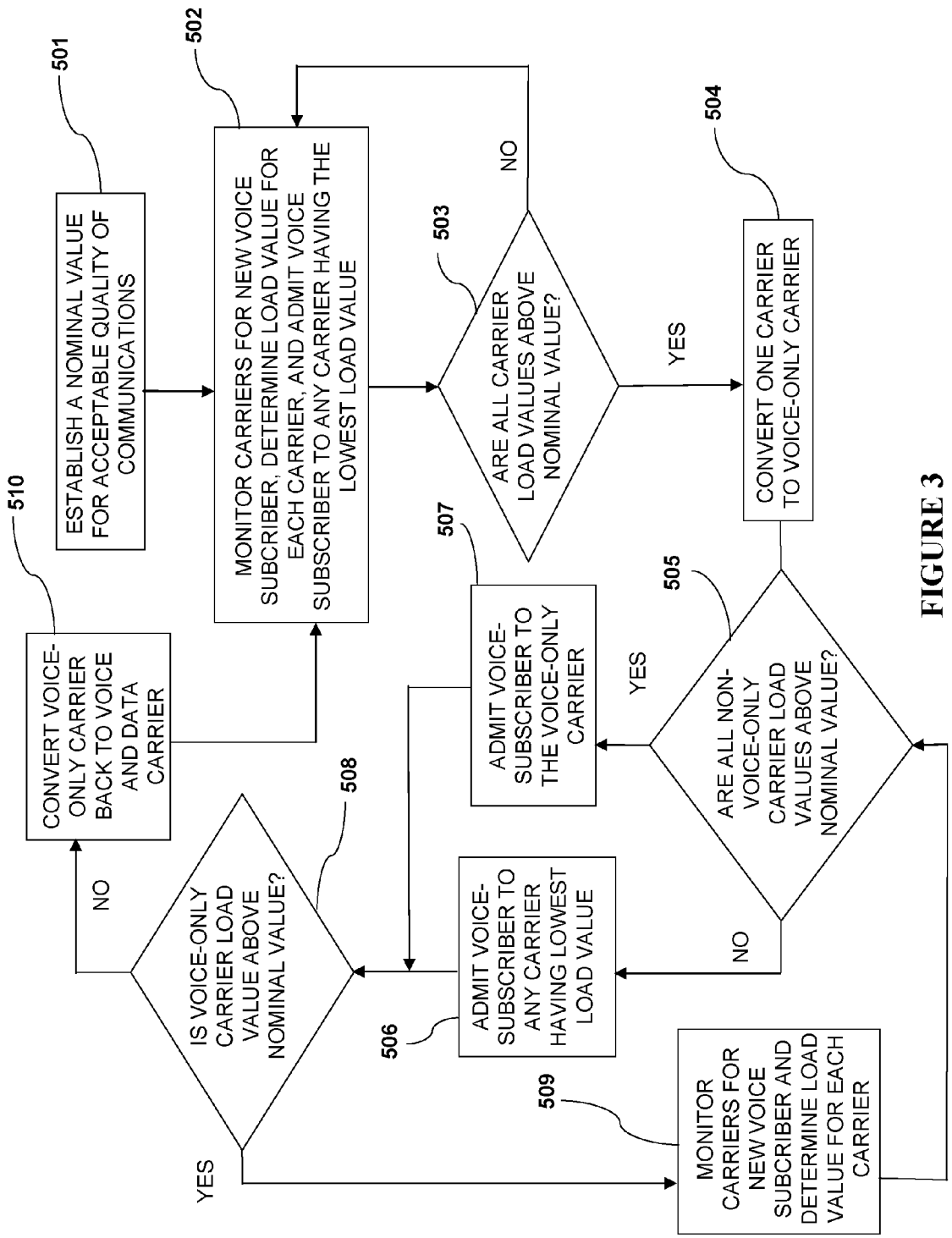
FIG. 3 is a flowchart that the method of load balancing in accordance with the present invention.
Figure 4:
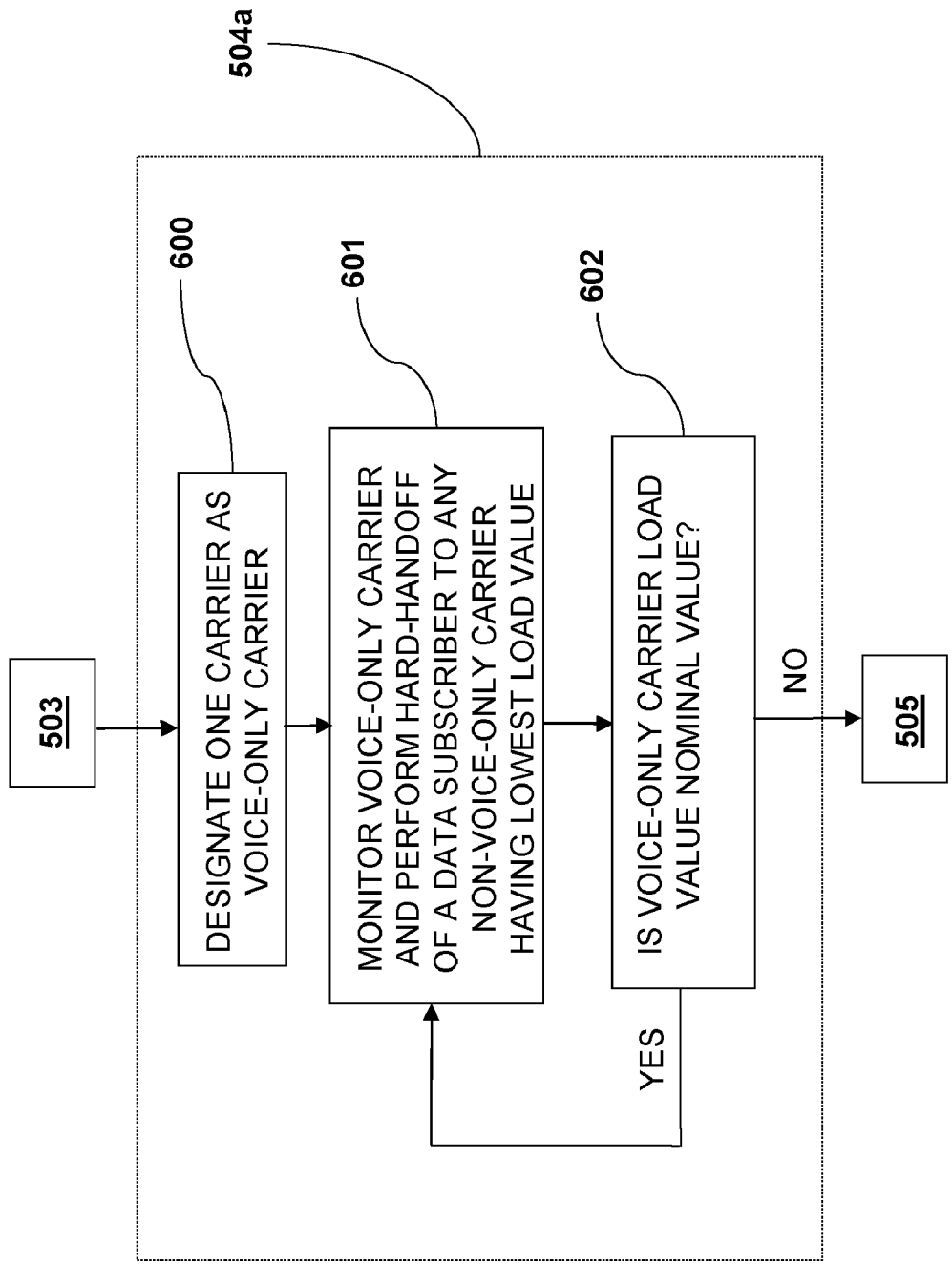
FIG. 4 is a flowchart corresponding to FIG. 1 that shows conversion of a carrier with hard handoff during voice loading in accordance with the present invention.

Secondly, when the nominal voice loading in all carriers has reached the pre-defined threshold (or nominal value), and if it is desirable to further admit new voice calls into the system, the method of the present invention provides for converting one of the carriers to a voice-only carrier, step 504 in FIG. 3. Two approaches are possible under the method according to the present invention. Both the first and second approach involve converting one of the carriers into a voice-only carrier. The first approach used is illustrated in FIG. 1 and the second approach in FIG. 2, where the flowcharts representing the corresponding method steps are shown in FIG. 4 and FIG. 5, respectively. For purposes of illustration, the alternative approaches for accomplishing the converting step 504 in FIG. 3 is shown as steps 504a and 504b in FIGS. 4 and 5, respectively.

In the first approach for converting one carrier to voice-only, there are three basic steps 600, 601, and 602 as shown in FIG. 4. First, one of the carriers is designated as a voice-only carrier where additional voice calls will be admitted to this carrier. The voice-only carrier is monitored such that hard-handoff is performed in order to remove a data subscriber from the voice-only carrier onto any other available carrier having the lowest load value. Of course, if more than one available non-voice-only carriers have the same load value, any of them can take on removed data subscriber. This is repeated until the voice-only carrier load is reduced to the established nominal value for an acceptable quality of communications. Existing single carrier (e.g., 1xEV-DV) data users (subscribers) on this voice-only carrier will be handed off to the other non-voice-only carriers. For the case of multi-carrier DV (MC-DV), no handoff is required. Multi-carrier scheduling will be performed on the remaining carriers.

In the second approach for converting one carrier to voice-only, there are five basic steps 700 through 704 as shown in FIG. 5. As in the first approach, one of the carriers is designated as a voice-only carrier where additional voice calls will be admitted to this carrier. However, instead of the 'hard' transition (i.e., hard handoff) of a designated carrier from voice/data to voice-only as described above, the second approach is to gracefully transform the voice/data carrier into a voice-only carrier by shrinking the allowable base station transmit power for data from (100%-overhead power-total voice power) to (z %-overhead power-total voice power), where z is less than 100. This is to reduce the intra- and inter-cell interference experienced by the voice users. Thus, the present invention maintains the voice outage (e.g., to less than 3%) when the nominal voice loading is increased beyond a suitable threshold (e.g., 50%).

On the other hand, the available power for data in this carrier will be reduced, thus reducing the data capacity in this carrier. A graceful 'migration' of data users in this carrier to the other carriers can be done during the dormant-active states transition operation, thus avoiding a hard-handoff type of disruption. A second threshold, y, is set such that if the nominal voice loading in the designated carrier increases beyond y %, then all the remaining data users will be moved to other carriers. In a single carrier system (e.g., 1xEV-DV), this means hard-handoff of the data users to other carriers. In MC-DV, no handoff is required. Multi-carrier scheduling will be performed on the remaining carriers. Steps 701 through 704 as shown represent this method once a carrier is designated as the voice-only carrier and correspond to the illustration of voice loading in FIG. 2. It is during the transitioning configuration between the first threshold x % and second threshold y % that this migration occurs. However, should the voice-only carrier exceed the second threshold y %, hard handoff will be used to remove data subscribers from that voice carrier until the transitioning configuration can be attained.

With further reference to FIG. 3, steps 505 through 509 serve to illustrate that new voice calls should be admitted to the designated 'voice-only' carrier as described in step 504

(and detailed in steps 504*a* and 504*b*) as long as all the other carriers that are non-voice-only are at x % loading. When the nominal voice loading of at least one of the carriers drops below x %, a new voice call should be admitted to the most lightly loaded carrier.

As the overall nominal voice loading of the system decreases such that the nominal voice loading of the designated voice-only carrier has dropped below the pre-defined threshold x %, the carrier is switched back to default operation as a voice and data carrier. This is represented by step 510.

In operation, the method of the present invention applies to systems with mixed power controlled voice (or other real-time circuit-switched services) and rate-controlled data services, such as 1xEV-DV, MC-DV, UMTS/HSDPA. Moreover, the invention applies to any deployment scenario where there are multiple carriers deployed, which is very common in most commercial CDMA deployment.

It should be understood that the preferred embodiments mentioned here are merely illustrative of the present invention. Numerous variations in design and use of the present invention may be contemplated in view of the following claims without straying from the intended scope and field of the invention herein disclosed.

What is claimed is:

1. A method of balancing voice and data traffic in a wireless communications network, the method comprising:
a call controller within the wireless communications network maintaining loading on a carrier at a level no greater than a predefined maximum load value for at least one of real-time service traffic and data traffic by converting the carrier from real-time service traffic and data traffic to real-time-service-only traffic upon exceeding the predefined maximum load value, the predefined maximum load value being a threshold defined to ensure acceptable quality of communications.

2. The method of claim 1, wherein the predefined maximum load value is a real-time service load value.

3. The method of claim 1, wherein the predefined maximum load value is a data load value.

4. The method of claim 1, wherein converting the carrier from real-time service traffic and data traffic to real-time-service-only traffic is accomplished by admitting additional real-time service traffic to the carrier while removing data traffic by hard handoff onto any other available carrier having a lowest load value until loading on said carrier is reduced below the predefined maximum load value.

5. The method of claim 1, wherein converting the carrier from real-time service traffic and data traffic to real-time-service-only traffic is accomplished by admitting additional real-time service traffic to the carrier while implementing a migration of data traffic onto any other available carrier having a lowest load value until loading on said carrier is reduced below the predefined maximum load value.

6. A system for balancing real-time and data call loads, the system comprising:
a call controller operable to dynamically manage relative real-time service and data service loading among one or more carriers to a prescribed quality of service level by converting at least one of said one or more carriers from real-time service traffic and data traffic to real-time-service-only traffic upon exceeding a carrier load value defined to ensure acceptable quality of communications.

7. The system of claim 6, wherein real-time service and data loads are maintained on different call carriers.

8. The system of claim 6, wherein base transceiver station transmit power is adjusted to maintain said prescribed quality of service level.

9. The system of claim 6, wherein intra-cell interference is maintained below a prescribed level.

10. The system of claim 6, wherein inter-cell interference is maintained below a prescribed level.

11. The system of claim 6, wherein the call controller migrates at least a portion of the real-time service or data loading from a first carrier to a second carrier.

12. The system of claim 6, wherein converting the carrier from real-time service traffic and data traffic to real-time-service-only traffic is accomplished by admitting additional real-time service traffic to the carrier while removing data traffic by hard handoff onto any other available carrier having a lowest load value until loading on the carrier is reduced below the carrier load value defined to ensure acceptable quality of communications.

13. The system of claim 6, wherein converting the carrier from real-time service and data traffic to real-time-service-only traffic is accomplished by admitting additional real-time service traffic to the carrier while implementing a migration of data traffic onto any other available carrier having a lowest load value until loading on the carrier is reduced below the carrier load value defined to ensure acceptable quality of communications.

14. A system operable to balance voice and data traffic in a wireless communications network, said system comprising: a call controller operable to maintain call loading on a carrier at a level not to exceed a predetermined maximum level for at least one of voice or data traffic in the carrier by converting said carrier from voice and data traffic to voice-only traffic upon exceeding said predetermined maximum level, wherein said predetermined maximum level is defined to ensure acceptable quality of communications.

15. The system as claimed in claim 14 further comprising, control means operable to effect call handoff from a first base transceiver station sector or cell site to a second base transceiver sector or cell site upon attainment of call loading for said at least one of voice or data traffic at a percentage of said predetermined maximum level.

16. The system as claimed in claim 14 wherein converting said carrier from voice and data traffic to voice-only traffic is accomplished by admitting additional voice traffic to said carrier while removing data traffic by hard handoff onto any other available carrier having a lowest load value until loading on said carrier is reduced below said established maximum load value.

17. The system as claimed in claim 14 wherein converting said carrier from voice and data traffic to voice-only traffic is accomplished by admitting additional voice traffic to said carrier while implementing a migration of data traffic onto any other available carrier having a lowest load value until loading on said carrier is reduced below said established maximum load value.

18. A method of balancing real-time service traffic and data traffic in a wireless communications network, the method comprising:
(a) a call controller unit distributing real-time service subscribers among a plurality of carriers until a load value for each carrier exceeds a nominal value associated with acceptable quality of communications;
(b) the call controller unit converting one of the carriers to a real-time-service-only carrier;
(c) when the load value of all carriers other than the real-time-service-only carrier exceeds the nominal value, the call controller unit admitting a new real-time service subscriber to the real-time service-only carrier;

(d) when the load value of the real-time-service-only carrier falls below the nominal value, the call controller unit converting the real-time-service-only carrier back to a real-time service and data carrier; and (e) repeating steps a though d.

19. The method of claim 18, wherein the converting one of the carriers to a real-time-service-only carrier includes:

designating one carrier as the real-time-service-only carrier; and performing a hard handoff of data subscribers on the real-time-service-only carrier to any carrier other than the real-time-service-only carrier until the load value of the real-time-service-only carrier falls below the nominal value.

20. The method of claim 18, wherein the converting one of the carriers to a real-time-service-only carrier includes:

designating one carrier as the real-time-service-only carrier;

performing a migration of data subscribers on the real-time-service-only carrier to any carrier other than the real-time-service-only carrier so long as said load value of the real-time-service-only carrier is between a first threshold equal to the nominal value and a second threshold equal to a value greater than the nominal value; and performing a hard handoff of data subscribers on said real-time-service-only carrier to any carrier other than the real-time-service-only carrier when the load value of the real-time-service-only carrier exceeds the second threshold.

21. A method, comprising:

a subscriber handset device receiving a wireless communication from a base station in a wireless communications network;

wherein a call controller within the wireless communications network is configured to maintain loading on a carrier at a level no greater than a predefined maximum load value for at least one of a real-time service traffic and data traffic by converting the carrier from real-time service traffic and data traffic to real-time-service-only traffic upon exceeding the predefined maximum load value, the predefined maximum load value being a threshold defined to ensure acceptable quality of communications.

\* \* \* \* \*